United States Patent [19]
Butler et al.

[11] 4,161,041
[45] Jul. 10, 1979

[54] PSEUDO RANDOM NUMBER GENERATOR APPARATUS

[75] Inventors: Eric W. Butler, Severna Park; Clinton W. Moulds, III, Millersville, both of Md.

[73] Assignee: The United States of America as represented by the Secretary of the Air Force, Washington, D.C.

[21] Appl. No.: 949,190

[22] Filed: Oct. 6, 1978

[51] Int. Cl.² ............................................. G11C 13/00
[52] U.S. Cl. ...................................... 365/244; 365/73

[58] Field of Search .................... 365/244, 78, 73, 76, 365/77

Primary Examiner—Terrell W. Fears
Attorney, Agent, or Firm—Joseph E. Rusz; William Stephanishen

[57] ABSTRACT

An improved pseudo random number generator apparatus utilizing a programmable read only memory to reduce autocorrelation magnitudes by mapping the maximal length shift register states into the final output states.

7 Claims, 9 Drawing Figures

3 BIT PSEUDO-RANDOM SEQUENCE WITH IMPROVED CORRELATION

PSEUDO RANDOM NUMBER GENERATOR APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a pseudo random number generator, and in particular to a pseudo random number generator apparatus utilizing programmable read only memories to improve autocorrelation.

In the prior art, the general method for generating either random or pseudo random numbers were methods known as the multiplicative and the mixed multiplicative techniques for generating uniformly distributed random numbers. These methods require the performance of one or more arithmetic operations such as, multiplication and addition, in the generation of each number. Thus, although they produce numbers with good randomness, these methods are relatively slow. The known methods for generating nonuniformly distributed random numbers are even more complicated than those for generating uniformly distributed numbers. Moreover, none of the commonly employed methods is capable of generating directly both uniformly and nonuniformly distributed numbers.

SUMMARY OF THE INVENTION

The present invention utilizes a maximal-length shift register in combination with a programmable read only memory to improve autocorrelation magnitudes by mapping the final output states from the shift register. The improved pseudo random number generator apparatus provides random number generation when more than two output states are required by using more bits from the shift register than are needed to provide greater autocorrelation by spreading the bits uniformly about other points.

It is one object of the present invention, therefore, to provide an improved pseudo random number generator apparatus.

It is another object of the invention to provide an improved pseudo random number generator apparatus having more than two output states.

It is another object of the invention to provide an improved pseudo random number generator apparatus wherein the autocorrelation magnitudes are reduced by mapping.

It is yet another object of the invention to provide an improved pseudo random number generator apparatus wherein a programmable read only memory is utilized to map the maximal length shift register states into the final output states.

These and other advantages, objects and features of the invention will become more apparent after considering the following description taken in conjunction with the illustrative embodiment in the accompanying drawings.

BRIEF DESCRIPTION OF THE DRAWINGS

FIG. 2b is a graphical representation in expanded scale of FIG. 2a;

FIG. 4b is a graphical representation in expanded scale of the improved autocorrelation shown in FIG. 4a;

DESCRIPTION OF THE PREFERRED EMBODIMENT

Figure 1:
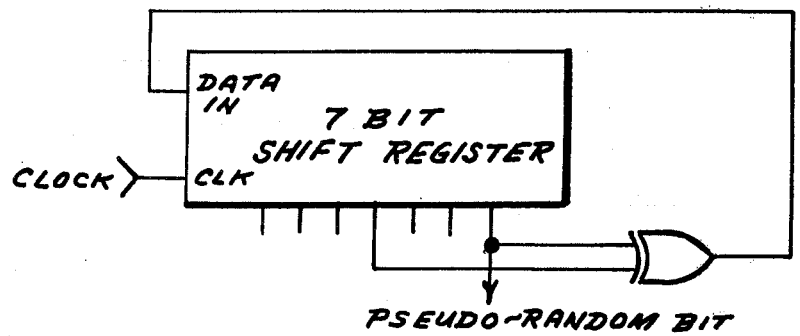
FIG. 1 is a block diagram of a prior art single bit pseudo random number generator.

It is often necessary in the prior art to generate a single-bit random number in digital hardware, the method most often used is the tapping of a bit from a maximal length shift register. This procedure involves very little hardware and exhibits the necessary characteristics of a random number. Since the bit obtained, has a finite repeat cycle it is not a true random number generator and thus, the generator is called a pseudo-random number generator. There is shown in FIG. 1 a typical schematic for a prior art seven bit, maximal length shift register wherein one bit is tapped off and labeled a pseudo-random bit. If the application required repeatedly selecting a random number from 0 to X, where X may be any positive integer greater than 1, then it becomes beneficial and/or necessary to map from the shift register to the random number. When X is not of the form $2^j - 1$ (j is an integer) than mapping from the shift register is necessary. However, even if X is of the form $2^j - 1$ significant improvement in the autocorrelation which is a measure of the predictability of one state given another state of a process, can be realized by mapping.

If X is of the form $2^j - 1$, the prior art approach is to tap j bits from the shift register. This approach is often taken and in many cases it's randomness is satisfactory. However, when analysis is made on the pattern generated, it is seen that this result yields a high degree of autocorrelation about its reference point n=0. For example, take the schematic of FIG. 1 and assume that the random number must be one of eight states, hence a 3 bit binary number. Analysis of the autocorrelation is made of the results of this simple extension by means of equation 1 below.

$$\rho(n) = \frac{\frac{1}{N}\sum_{i=0}^{N-1}(x_i - \bar{x})(x_{i+n} - \bar{x})}{\frac{1}{N}\sum_{i=0}^{N-1}(x_i - \bar{x})^2}$$

where:
$\rho(n)$ = autocorrelation,
$x_i$ = ith OUTPUT STATE OF THE PROCESS
$x_{i+n}$ = i+nth OUTPUT STATE OF THE PROCESS $$\bar{x} = \frac{1}{N} \sum_{i=0}^{N-1} x_i$$

N = CYCLE LENGTH OF THE PROCESS

Figure 2A:
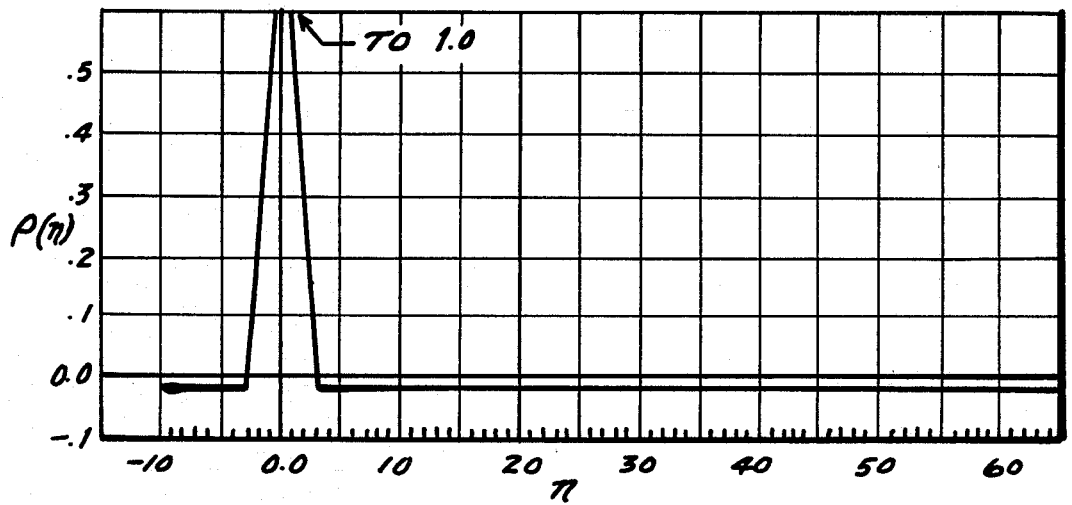
FIG. 2a is a graphical representation of the autocorrelation of three bits of a prior art seven bit shift register.
Figure 2B:
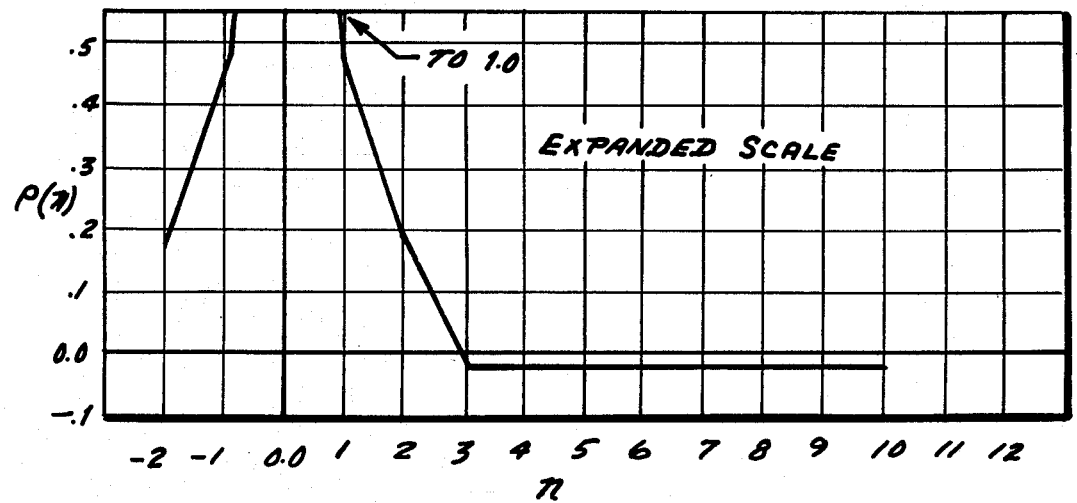

For the circuit being analyzed, i.e., a seven bit shift register there are $2^7 - 1$ (127) states (the all zero state being excluded). The circuit was simulated on a computer program and the three bits of interest were then substituted into equation 1, above. The results are shown in FIGS. 2a and 2b. The computer run used to simulate the circuit is shown in table 1 below and the program used for analysis of the resulting data is shown in table 2 also below.

TABLE 1

SIMULATION OF SEVEN BIT MAXIMAL LENGTH SHIFT REGISTER

| 00101 | 1* |     | IMPLICIT INTEGER (A-Z) |
|-------|-----|-----|------------------------|
| 00103 | 2* |     | READ(5,100)RI |
| 00106 | 3* | 100 | FORMAT(03) |
| 00107 | 4* |     | WRITE (6,150)RI |
| 00112 | 5* | 150 | FORMAT ('1','CLOCK',2X,'REGISTER',2X,'START=1,03) |
| 00113 | 6* |     | INDEX=−1 |
| 00114 | 7* | 1   | INDEX=INDEX+1 |
| 00115 | 8* |     | RO=RI |
| 00116 | 9* |     | B4=AND(RO,8)/2**3 |
| 00117 | 10* |    | B7=AND(RO,1) |
| 00120 | 11* |    | B1=XOR(B4,B7)*2**6 |
| 00121 | 12* |    | DUMMY=RO/2+B1 |
| 00122 | 13* |    | RI=AND(2**7−1,DUMMY) |
| 00123 | 14* |    | WRITE(6,200)INDEX,RO |
| 00127 | 15* | 200 | FORMAT('0',03,4X,03) |
| 00130 | 16* |    | IF(INDEX.LT.200)GO TO 1 |
| 00132 | 17* |    | STOP |
| 00133 | 18 |     | END |

END OF COMPILATION: NO DIAGNOSTICS.

TABLE 2

AUTO-CORRELATION PROGRAM

75/12/11.    12.01.18.
PROGRAM      AUTO

| 10  | DIM A(127),P(127,127) |
| 20  | LET S=O |
| 30  | LET S1=O |
| 40  | FOR I=1 TO 127 |
| 50  | READ A(I) |
| 60  | LET S=S+A(I) |
| 70  | LET S1=S1+A(I)*A(I) |
| 80  | NEXT I |
| 85  | PRINT S/127,S1/127 |
| 90  | FOR I=1 TO 127 |
| 100 | FOR J=1 TO 127 |
| 110 | LET P(I,J)=A(I)*A(J) |
| 120 | NEXT J |
| 130 | NEXT I |
| 140 | FOR N=0 TO 126 |
| 150 | LET S2=O |
| 170 | FOR I=1 TO 127 |
| 180 | IF I+N>127 THEN 300 |
| 190 | LET B=I+N |
| 200 | GO TO 310 |
| 300 | LET B=I+N−127 |
| 310 | LET S2=S2+P(I,B) |
| 320 | NEXT I |
| 330 | LET C=(S2−S*S/127)/(S1−S*S/127) |
| 340 | PRINT N,C |
| 350 | NEXT N |

It may be seen from the graphs that in the region near 0 there is a high degree of autocorrelation between successive shifts. It is to be further noted that outside of this region the degree of autocorrelation is negative and equal for all other points.

It is apparent that tapping any 3 bits from the shift register will have a high degree of correlation for ±2 shifts of n=0. Even if the bits are jumbled, i.e., define $0_8$ as $6_8$, $1_8$ as $5_8$, etc., the autocorrelation graph will not change appreciably. Tapping off non-consecutive bits from the shift register will yield improved autocorrelation for ±1 shift from n=0 but will extend the band of poor autocorrelation from ±2 shifts of n=0 to ±6 bits of n=0 for the seven bit shift register used in the example.

By using more bits from the shift register than are required and mapping these bits to the required states, the poor autocorrelation about n=0 can be spread more uniformly to other points. The particular application balanced with minimizing hardware will dictate the length of the shift register. For example, six-bit shift registers which are currently available in conjunction with an exclusive-or chip will yield a $2^{12} - 1 = 4095$ cycle. The more bits used from the register, the greater flexibility one has in mapping and also the better the results. Using a programmable read only memory provides the ability to map in any way chosen by programming accordingly. In order to obtain a better comparison with the prior art example, the seven bit shift register will be used. Six bits from this register will be used as inputs to the mapping. A couple of alternate methods of mapping will be compared with the 3 bits from the shift register of the prior art with no mapping. The 127 six-bit words used for the mapping are known from the simulation referred to earlier. These states become the address inputs for the analysis that follows.

Figure 3:
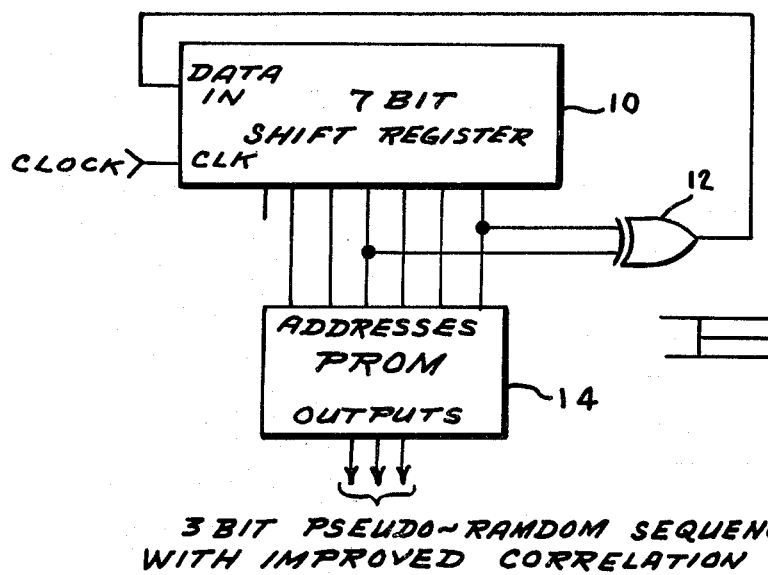
FIG. 3 is a block diagram of a three bit pseudo random number generator apparatus according to the present invention.

Turning now to FIG. 3 there is shown a block diagram of an improved pseudo random number generator apparatus utilizing a seven bit shift register 10, an exclusive-or circuit 12, and a programmable read only memory (PROM) 14. The contents of the PROM 14 and thus the ultimate outputs of the random number generator, are integers 1 to N. N in the present example does not have to be a power of 2. Since there are more addresses than there are distinct output states, the addresses may be assigned to the output states as follows: addresses 0 to N−1 are respectively assigned to states N to 1, addresses N to 2N−1 are respectively assigned to states 1 to N, addresses 2N to 3N−1 to states N to 1, addresses 3N to 4N−1 to states 1 to N, etc. The key features are that address 0 is assigned to state N, and that neighboring blocks of N ascending addresses are assigned to 1 to N in the opposite order. There is shown in Table 3 a metatreptic mapping of 64 addresses into 8 output states.

TABLE 3
METATREPTIC MAPPING OF 64 ADDRESSES INTO 8 OUTPUT STATES

| 0 | 1 | 2 | 3 | 4 | 5 | 6 | 7 | Output States |
|---|---|---|---|---|---|---|---|---|
| 7 | 6 | 5 | 4 | 3 | 2 | 1 | 0 | |
| 10 | 11 | 12 | 13 | 14 | 15 | 16 | 17 | |
| 27 | 26 | 25 | 24 | 23 | 22 | 21 | 20 | Octal Input |
| 30 | 31 | 32 | 33 | 34 | 35 | 36 | 37 | Addresses |
| 47 | 46 | 45 | 44 | 43 | 42 | 41 | 40 | |
| 50 | 51 | 52 | 53 | 54 | 55 | 56 | 57 | |
| 67 | 66 | 65 | 64 | 63 | 62 | 61 | 60 | |
| 70 | 71 | 72 | 73 | 74 | 75 | 76 | 77 | |

Figure 4A:
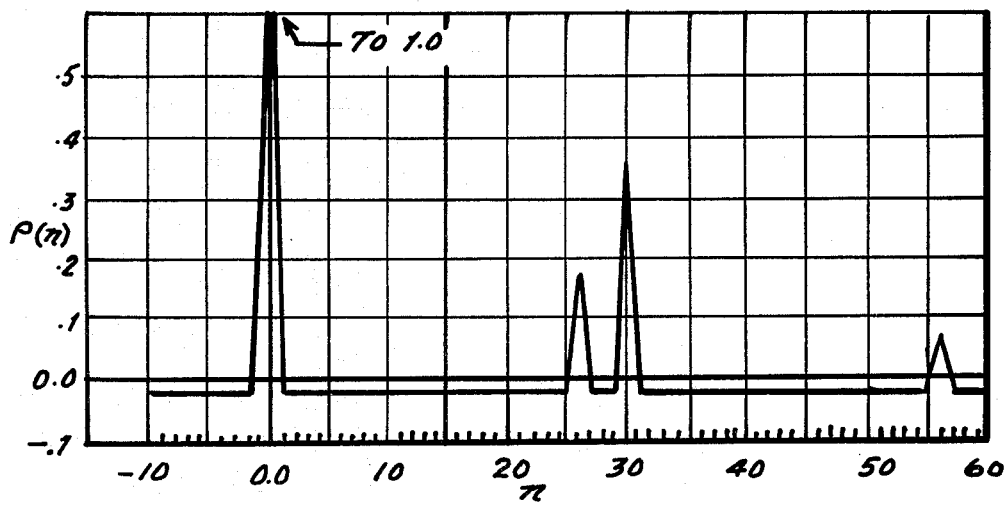
FIG. 4a is a graphical representation of the autocorrelation improvement with metatreptic mapping.
Figure 4B:
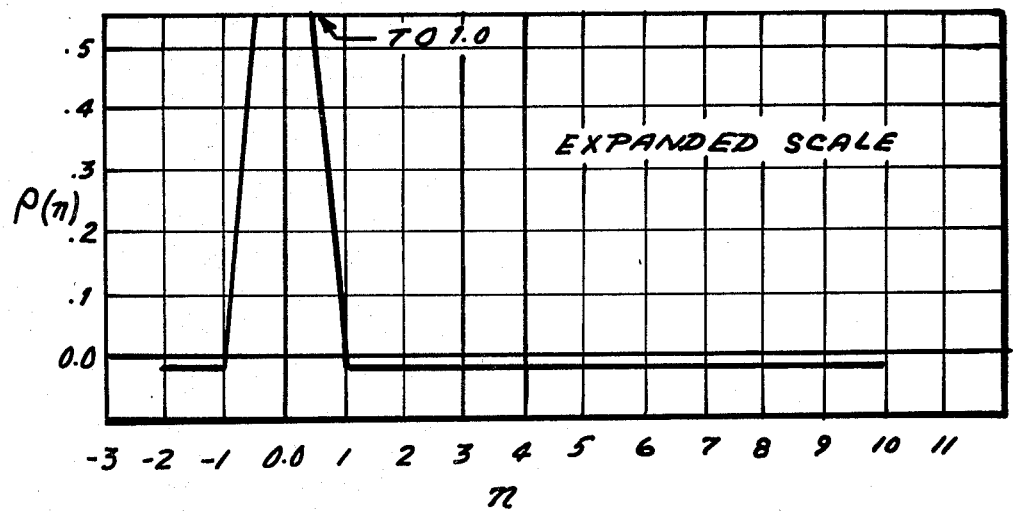

This method yields good results for $\rho(n)$ when n is small, but can have greater values of $\rho(n)$ for larger n. There is shown in FIGS. 4a and 4b $\rho(n)$ for such a mapping when the output states are 1 to 8 (or equivalently, 0 to 7).

An alternative method using random mapping is also given. If m bits from the shift register are used as the addresses for the PROM, and the output states are 1 to N, a random or pseudo-random sequence (1 to $2^m$) of $M=2^m$ numbers drawn from the integers 1 to N is obtained from a computer program or from a table. Addresses 0 to M−1 are sequentially assigned to the members of the sequence of M integers. There is shown in Table 4 a random mapping of 64 addresses into 8 output states.

TABLE 4
RANDOM MAPPING OF 64 ADDRESSES INTO 8 OUTPUT STATES

| 0 | 1 | 2 | 3 | 4 | 5 | 6 | 7 | Output States |
|---|---|---|---|---|---|---|---|---|
| 1 | 24 | 3 | 17 | 5 | 12 | 2 | 0 | |
| 7 | 31 | 10 | 30 | 6 | 13 | 20 | 4 | |
| 21 | 33 | 16 | 36 | 25 | 14 | 32 | 11 | Octal Input |
| 22 | 42 | 46 | 37 | 26 | 15 | 41 | 35 | Addresses |
| 23 | 54 | 62 | 43 | 34 | 26 | 45 | 40 | |
| 63 | 72 | 67 | 52 | 44 | 47 | 51 | 53 | |
| 73 | 75 | 71 | 56 | 50 | 57 | 64 | 55 | |
| 77 | 76 | 74 | 61 | 66 | 70 | 65 | 60 | |

Figure 5A:
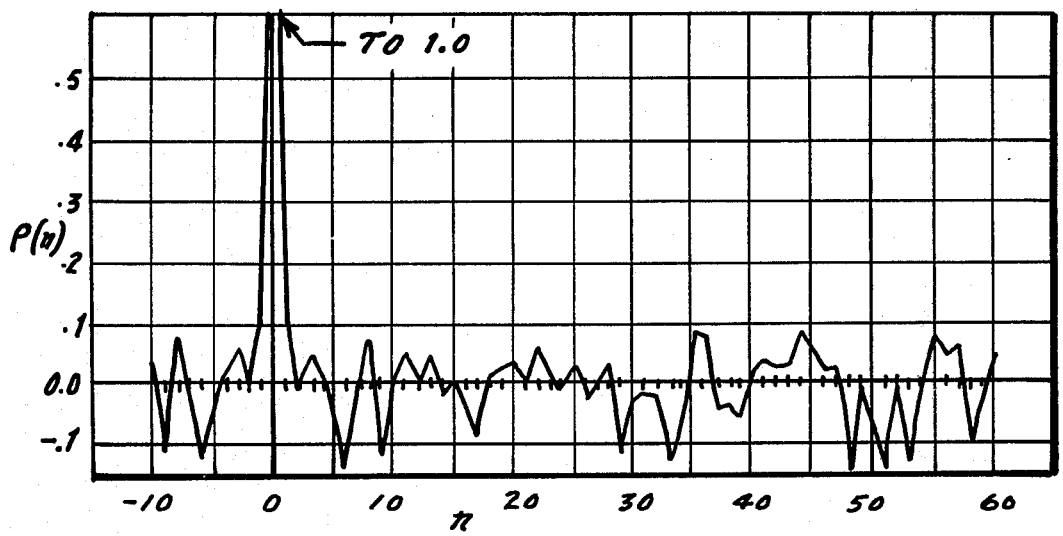
FIG. 5a is a grapical representation of the autocorrelation improvement with random mapping.
Figure 5B:
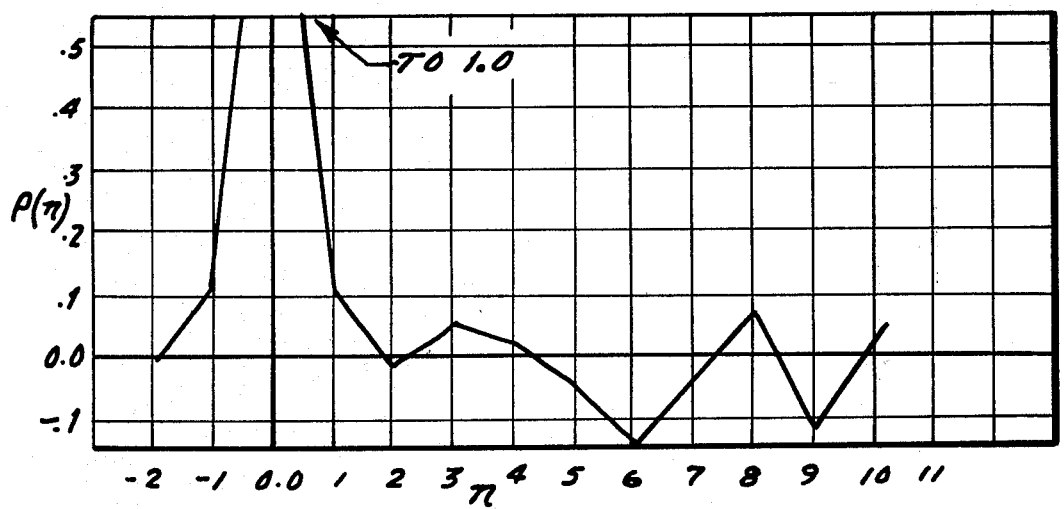
FIG. 5b is a graphical representation in expanded scale of the improved autocorrelation shown in FIG. 5a; and, FIG. 6 is a block diagram of a three bit 8 state pseudo random number generator apparatus.

This method evenly distributes $\rho(n)$ over the entire repeat cycle, but has larger magnitudes than the small-n values of $\rho(n)$ for Method 1. There is shown in FIGS. 5a and 5b $\rho(n)$ for output states 0 to 7 when the pseudo-random integer sequence was obtained from a computer program's uniform random number algorithm.

Figure 6:
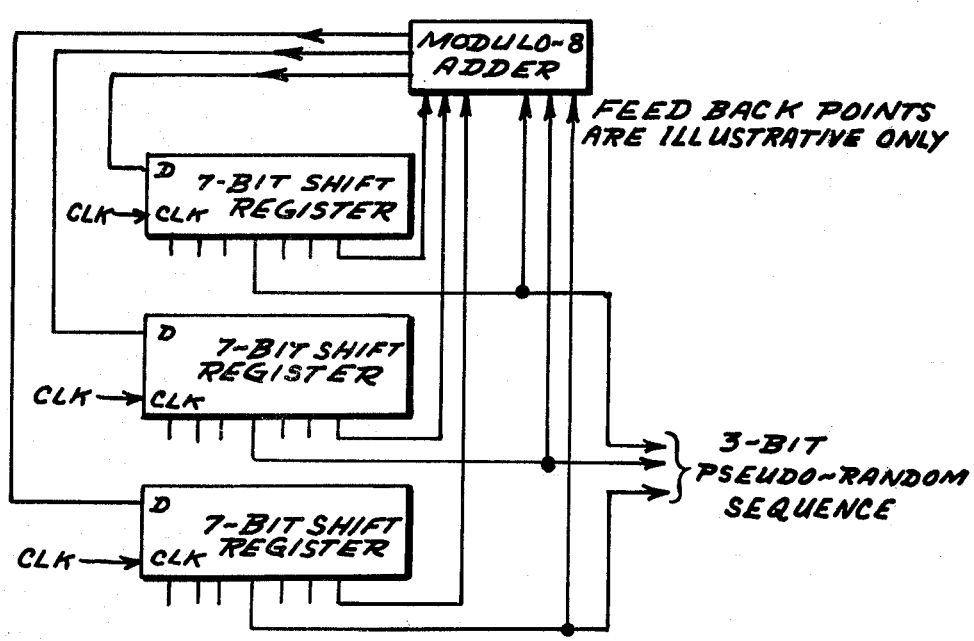

The previously described alternative methods of generating a 3 bit pseudo-random number are simple to mechanize with minimal chips. Either method has a general extension to any length shift register and any number of states for the random number. However, another method that may be utilized, is to make an extension of the maximal-length shift register where the necessary number of states are tapped from parallel shift registers rather than multiple bits from a single-bit shift register. The arithmetic logic then becomes a modulo adder of the base that corresponds with the number of states required of the random number. There is shown in FIG. 6 a 3 bit, 8 state random number generator block diagram. It has a maximal length of $(2^3)^7-1$. However, if the number of states assumed by the random number is not a power of 2, then the hardware implementation of the modulo addition becomes quite complex.

The present invention provides a simple way of generating of pseudo-random binary number that is applicable to any case where the random number assumes more than two states and the number of states does not need to be a power of 2. For example, this random number generator can select a number from 1 to 5. It is this characteristic that required a mapping from a power-of-2 to a non-power-of-2 number of states if the maximal-length shift register was to be used.

The procedure then is:
1. decide the length of the maximal-length shift register;
2. tap off the register with the following in mind,
   a. Use more points than is necessary to represent the desired random number
   b. use enough points to obtain a satisfactory probability that any given state will be selected;
3. assign the input states to the random binary states at the output using (depending on the application) either method 1 or method 2 given above;
4. put the above assignment (mapping) into a PROM.

If method 2 is used, the quality, i.e. autocorrelation distribution of any resultant circuit should be simulated to see if any anomaly such as poor autocorrelation at or near n=0 or non-uniform assignment of input to output states. If this should happen, step 3 above should be repeated and/or the number of bits taken off the shift register in step 2 may have to be increased.

Although the invention has been described with reference to a particular embodiment, it will be understood to those skilled in the art that the invention is capable of a variety of alternative embodiments within the spirit and scope of the appended claims.

What is claimed is:

1. A pseudo random number generator apparatus comprising in combination:
   a shift register having a predetermined bit length, said shift register having a clock input and a data input, said shift register having a plurality of output states, said shift register receiving a clock signal and a data signal, said shift register shifting said data signals to said plurality of output states,
   an exclusive or gate having a predetermined number of input lines and an output line, said output line being connected to said data input of said shift register, each line of said predetermined number of input lines being randomly connected to a single line of said plurality of output states of said shift register, and,
   a programmable read only memory connected to (n−1) of said plurality of output states of said shift register wherein n is equal to number of said predetermined bit length, said programmable read only memory have a plurality of output lines, said programmable read only memory assigning addresses to each integer appearing on said plurality of output lines, said programmable read only memory providing a random number on said plurality of output lines.

2. An apparatus as described in claim 1 wherein metatreptic mapping by said programmable read only memory of said plurality of output states is utilized, said programmable read only memory assigning addresses in the following sequence: addresses 0 to N−1 are assigned to states N to 1, addresses N to 2N−1 are assigned to states 1 to N, addresses 2N to 3N−1 to states N to 1, addresses 3N to 4N−1 to states 1 to N et sequens.

3. An apparatus as described in claim 1 wherein random mapping is utilized by said programmable read only memory to provide a pseudo random sequence of $M = 2^m$ where m equals the number of bits from said shift register and M equals the number of members in the random sequence.

4. An apparatus as described in claim 1 wherein said plurality of output states are equal to the number of said predetermined bit length.

5. An apparatus as described in claim 1 wherein said predetermined bit length equals seven.

6. An apparatus as described in claim 1 wherein said predetermined number of input lines equal two.

7. An apparatus as described in claim 1 wherein said plurality of output lines from said programmable read only memory equal three.

* * * * *